United States Patent
Kuroda (10) Patent No.: US 10,873,235 B2
(45) Date of Patent: Dec. 22, 2020

(54) DC MOTOR WITH A POSITIVE TEMPERATURE COEFFICIENT THERMISTOR

(71) Applicant: Minebea Mitsumi Inc., Nagano (JP)

(72) Inventor: Minoru Kuroda, Sakaiminato (JP)

(73) Assignee: MINEBEA MITSUMI INC., Nagano (JP)

( * ) Notice: Subject to any disclaimer, the term of this patent is extended or adjusted under 35 U.S.C. 154(b) by 436 days.

(21) Appl. No.: 15/715,536

(22) Filed: Sep. 26, 2017

(65) Prior Publication Data

US 2018/0091025 A1    Mar. 29, 2018

(30) Foreign Application Priority Data

Sep. 29, 2016   (JP) .................. 2016-190562

(51) Int. Cl.
| | |
|---|---|
| *H02K 5/14* | (2006.01) |
| *H02K 11/25* | (2016.01) |
| *H02K 11/27* | (2016.01) |
| *H02K 13/10* | (2006.01) |
| *H02K 11/00* | (2016.01) |

(Continued)

(52) U.S. Cl.
CPC .......... *H02K 5/143* (2013.01); *H02K 11/026* (2013.01); *H02K 11/25* (2016.01); *H02K 11/27* (2016.01); *H02K 13/10* (2013.01); *H02K 5/145* (2013.01); *H02K 11/0094* (2013.01); *H02K 23/66* (2013.01)

(58) Field of Classification Search
CPC .......... H02K 5/14; H02K 5/143; H02K 5/145; H02K 5/146; H02K 5/148; H02K 5/24; H02K 11/0094; H02K 11/02; H02K 11/022; H02K 11/024; H02K 11/026;

(Continued)

(56) References Cited

U.S. PATENT DOCUMENTS

| | | | | |
|---|---|---|---|---|
| 5,600,193 A | * | 2/1997 | Matsushima | H02K 5/145 310/68 C |
| 6,300,696 B1 | * | 10/2001 | Wong | H02K 5/145 310/239 |

(Continued)

FOREIGN PATENT DOCUMENTS

| | | |
|---|---|---|
| JP | 2006-166646 A | 6/2006 |
| JP | 2009-165209 A | 7/2009 |
| JP | 2014-226004 A | 12/2014 |

*Primary Examiner* — Jue Zhang
*Assistant Examiner* — David A. Singh
(74) *Attorney, Agent, or Firm* — Pearne & Gordon LLP (57) ABSTRACT

A DC motor includes: a brush configured to be connectable with the commutator; a first terminal attached to the brush; a second terminal disposed at a position away from the first terminal, the second terminal being configured to be connectable with an external terminal; a bracket to which the first terminal and the second terminal are attached; and a positive temperature coefficient (PTC) thermistor disposed between the first terminal and the second terminal, the PTC thermistor including a first electrode bonded to the first terminal and a second electrode bonded to the second terminal, wherein the PTC thermistor is a surface-mount type thermistor in which the first electrode and the second electrode are exposed on one surface side and wherein, on the one surface side of the PTC thermistor, the first electrode faces the first terminal and the second electrode faces the second terminal.

19 Claims, 5 Drawing Sheets

(51) Int. Cl.
*H02K 11/026* (2016.01)
*H02K 23/66* (2006.01)

(58) Field of Classification Search
CPC ........ H02K 11/20; H02K 11/25; H02K 11/26;
H02K 11/27; H02K 13/00; H02K 13/10;
H02K 23/66
USPC ...... 310/10, 40 R, 66, 68 R, 68 C, 219, 238,
310/239, 248, 249
See application file for complete search history.

(56) References Cited

U.S. PATENT DOCUMENTS

| | | | | |
|---|---|---|---|---|
| 2003/0157399 A1* | 8/2003 | Ikeuchi | .................... | H01C 1/14 429/62 |
| 2004/0108936 A1* | 6/2004 | Han | ..................... | H01C 1/1406 338/22 R |
| 2005/0258691 A1* | 11/2005 | Furuki | ................... | H02K 5/145 310/89 |
| 2006/0028090 A1* | 2/2006 | Machida | ................ | H02K 5/225 310/239 |
| 2009/0153000 A1* | 6/2009 | Shibata | .................. | H01C 7/021 310/68 C |
| 2010/0270879 A1* | 10/2010 | Matsushita | ............ | H02K 5/145 310/71 |
| 2010/0320854 A1* | 12/2010 | Yamazaki | .............. | H02K 5/148 310/72 |
| 2011/0140554 A1* | 6/2011 | Wong | ....................... | H02K 1/17 310/71 |
| 2013/0002069 A1* | 1/2013 | Matsumoto | .......... | H02K 11/026 310/71 |
| 2013/0002070 A1* | 1/2013 | Matsumoto | .......... | H02K 11/026 310/71 |
| 2014/0312731 A1* | 10/2014 | Oguri | .................... | H02K 13/00 310/239 |
| 2014/0319948 A1* | 10/2014 | Nagase | .................. | H02K 5/145 310/83 |
| 2014/0356200 A1* | 12/2014 | Chan | ..................... | F04D 29/4293 417/423.7 |
| 2015/0130329 A1* | 5/2015 | Kawashima | ............ | H02K 23/32 310/68 C |
| 2015/0180299 A1* | 6/2015 | Kuroda | .................. | H02K 5/10 310/71 |
| 2018/0316249 A1* | 11/2018 | Tanaka | .................. | H02K 11/25 |

* cited by examiner

DC MOTOR WITH A POSITIVE TEMPERATURE COEFFICIENT THERMISTOR

CROSS-REFERENCE TO RELATED APPLICATION

This application claims priorities from Japanese Patent Application No. 2016-190562 filed on Sep. 29, 2016, the entire subject matters of which is incorporated herein by reference.

TECHNICAL FIELD

The present disclosure relates to DC motor, and particularly to a DC motor including a PTC thermistor.

BACKGROUND

As a DC motor, there is a DC motor including a positive temperature coefficient (PTC) thermistor. The PTC thermistor is used as a circuit protection element, and functions as a current limiting element of which resistance rapidly increases when the temperature exceeds a predetermined temperature.

In JP-A-2014-226004, JP-A-2006-166646, and JP-A-2009-165209, a structure of a DC motor which uses a PTC thermistor is disclosed. The PTC thermistor is disposed between a power supply terminal and a brush. The PTC thermistor has a shape of a plate of which both surfaces are electrodes, a terminal on a power supply side is connected to one surface, a terminal to which the brush is connected is connected to the other surface, and the PTC thermistor is used while being interposed between the two terminals.

However, in a case where the PTC thermistor is disposed in the DC motor which has, for example, a cylindrical shape or an angular shape (which has an outer diameter having a substantially quadrangular shape on a section perpendicular to a rotation shaft (here, the substantially quadrangular shape has, for example, a shape having roundness of a radius R in a corner portion, or a shape to which chamfering is performed in the corner portion)), there is a problem that it is difficult to ensure a space for disposing the PTC thermistor on the inside of the motor as the size of the DC motor decreases. Specifically, in disposing the PTC thermistor on the inside of the DC motor, it is necessary to avoid a commutator, a brush, a terminal to which the brush is connected and the like. Therefore, in accordance with a decrease in size of the motor, it is necessary to use a small PTC thermistor.

Meanwhile, for example, in a PTC thermistor which is a type that is used in motors described in JP-A-2014-226004, JP-A-2006-166646, and JP-A-2009-165209 which are described above and is used being nipped, or in a so-called lead line type PTC thermistor, there is a problem that it is difficult to prepare a PTC thermistor which is small and satisfies required functions. In other words, such a small PTC thermistor type has a problem that internal resistance is relatively high and torque of the DC motor decreases. There is a case where trip time is extremely short, and there is a problem that there is a possibility that a continuous operation becomes impossible depending on use.

Regarding such problems, as a surface mounting type PTC thermistor, there are a PTC thermistor which has relatively low internal resistance, a PTC thermistor which has a relatively long trip time, and a PTC thermistor which has an appropriately required functions even when the size is small. However, in the related art, in mounting such a surface-mount type PTC thermistor on the inside of the DC motor, it is necessary to prepare an additional component, such as a substrate, and there is a problem that the number of components of the DC motor increases.

SUMMARY

One of objects of the present disclosure is to provide a DC motor which is capable of usage of the surface-mount type PTC thermistor and has less number of components.

According to one aspect of the present invention, there is provided a DC motor including: a brush configured to be connectable with a commutator; a first terminal attached to the brush; a second terminal disposed at a position away from the first terminal, the second terminal being configured to be connectable with an external terminal; a bracket to which the first terminal and the second terminal are attached; and a positive temperature coefficient (PTC) thermistor disposed between the first terminal and the second terminal, the PTC thermistor including a first electrode bonded to the first terminal and a second electrode bonded to the second terminal, wherein the PTC thermistor is a surface-mount type thermistor in which the first electrode and the second electrode are exposed on one surface side, and wherein, on the one surface side of the PTC thermistor, the first electrode faces the first terminal and the second electrode faces the second terminal.

According to another aspect of the present invention, there is provided a motor including: a motor frame; a shaft rotatably supported by the motor frame and extended in an axial direction; a bracket attached to the motor frame and including a penetration hole through; which the shaft is passed and a groove; a positive temperature coefficient (PTC) thermistor having a first surface and a second surface opposite to the first surface, a first electrode portion exposed from the first surface and a second electrode portion exposed from the first surface; a first terminal arranged in the groove and attached to a brush; and a second terminal arranged in the groove and arranged at a position away from the first terminal, the second terminal being configured to be coupled with an external terminal, wherein the first electrode of the PTC thermistor is coupled to the first terminal and the second electrode of the PTC thermistor is coupled to the second terminal.

According to yet another aspect of the present invention, there is provided a motor comprising: a motor frame; a shaft rotatably supported by the motor frame and extended in an axial direction; and a bracket assembly attached to the motor frame, wherein the bracket assembly comprises; a bracket body having a penetration hole and a groove, the shaft is passed through the penetration hole; a first terminal arranged in the groove; a second terminal arranged in the groove, and a positive temperature coefficient (PTC) thermistor having a first surface and a second surface opposite to the first surface and arranged in the groove so that the first and second surfaces are arranged at a plane parallel to the axial direction, only one of the first and second surfaces being faced to the first and second terminals.

DETAILED DESCRIPTION

Hereinafter, a DC motor according to an embodiment of the present disclosure will be described.

Figure 1:
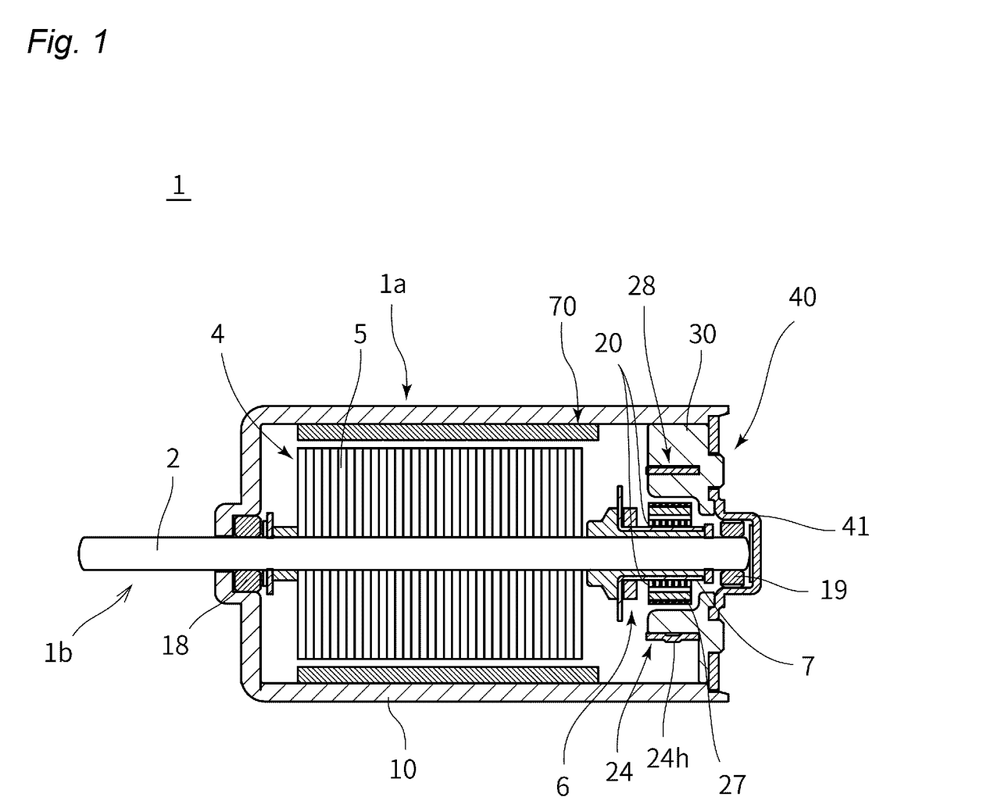
FIG. 1 is a side sectional view illustrating a DC motor according to an embodiment of the present disclosure.

FIG. 1 is a side sectional view illustrating a DC motor 1 according to an embodiment of the present disclosure.

As illustrated in FIG. 1, the DC motor (hereinafter, simply referred to as a motor) 1 roughly includes a frame assembly 1a, and an armature assembly (hereinafter, simply referred to as an armature) 1b which is supported to be rotatable around a rotation shaft 2 with respect to the frame assembly 1a.

The armature assembly 1b includes the rotation shaft (shaft) 2, an armature portion 4, a commutator portion 6 and the like. The armature portion 4 is attached to the rotation shaft 2. The armature portion 4 includes an armature core 5 which has a plurality of salient poles which protrude in a radial direction, a winding wire (not illustrated) wound around each of the salient poles. The commutator portion 6 is provided in the vicinity of a base end portion (end portion on a right side in FIG. 1) of the rotation shaft 2, and rotates together with the rotation shaft 2. The commutator portion 6 has a commutator 7 or the like which comes into contact with a brush 20 attached to the frame assembly 1a as will be described later.

The frame assembly 1a is configured of a frame 10, a bracket 30, a plate 41, a magnet 70 and the like.

The frame 10 has a tubular shape. A tip end portion (end portion on a left side in FIG. 1) of the rotation shaft 2 protrudes from one end portion of the frame 10 to block the one end portion. An opening portion of the other end portion (end portion on the right side in FIG. 1) of the frame 10 is blocked by the plate 41. In a frame configured of the frame 10 and the plate 41, the armature 1b is accommodated. One end portion of the rotation shaft 2 of the armature 1b protrudes from the frame 10. A bearing 18 is held in a center portion of the one end portion of the frame 10. A bearing 19 is held in a center portion of the plate 41. The rotation shaft 2 is held to be rotatable with respect to the frame 10 by the bearings 18 and 19 at two locations.

The bracket 30 is attached to an inner side of the plate 41. The bracket 30 is made of, for example, resin. The bracket 30 and the plate 41 are attached to the opening portion on the other end side of the frame 10.

Figure 2:
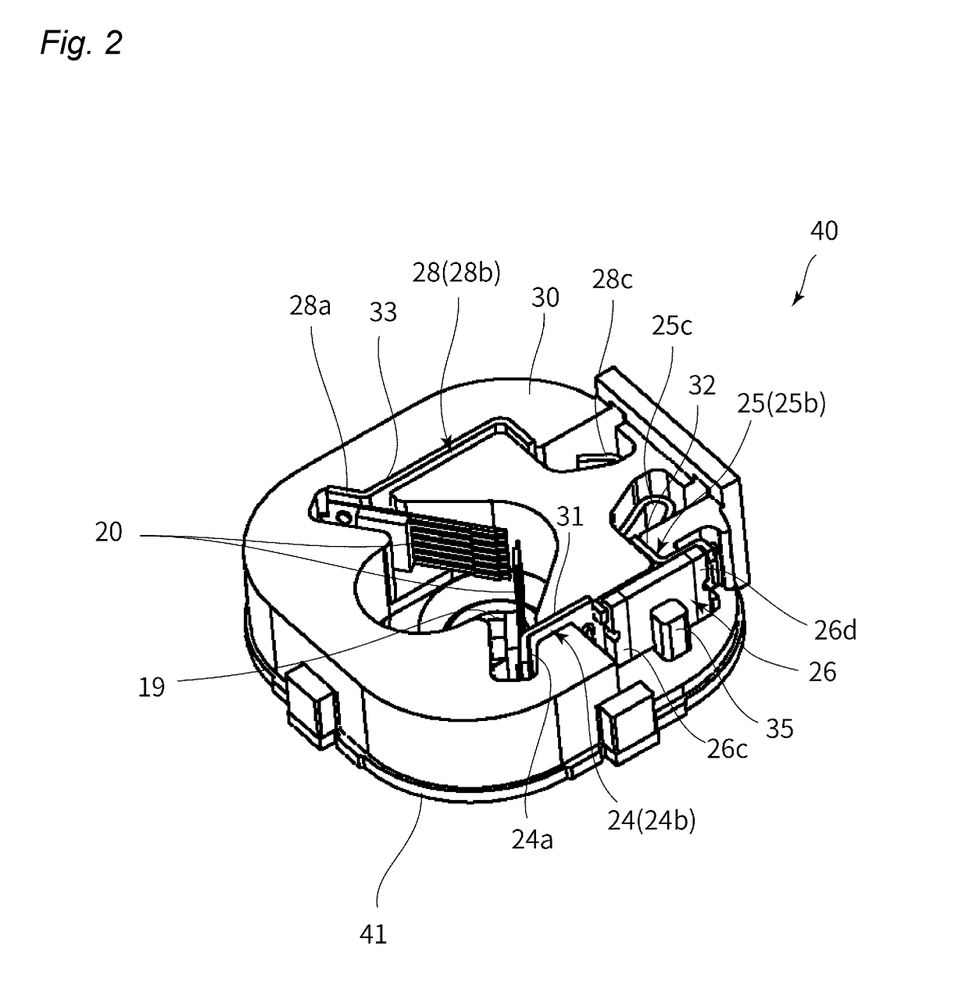
FIG. 2 is a perspective view illustrating a structure of a bracket unit.

FIG. 2 is a perspective view illustrating a structure of a bracket unit 40.

As illustrated in FIG. 2, the bracket unit 40 includes the bracket 30, the brush 20, a first terminal 24, a second terminal 25, a PTC thermistor 26, and a third terminal 28.

In the embodiment, the brush 20 is held by the bracket 30 via the first terminal 24 and the third terminal 28 such that a part in the vicinity of a tip end of a brush arm made of a metal plate comes into contact with the commutator 7. The brush arm roughly has a shape of a rectangular plate of which one direction on a plane perpendicular to the rotation shaft 2 is a longitudinal direction and a direction parallel to the rotation shaft 2 is a width direction.

The brush 20 is used in a state where the part in the vicinity of the tip end comes into contact with the commutator 7 and is slightly bent from a natural state. The brush arm is held by the first terminal 24 or the third terminal 28 to have flexibility (similar to a cantilever beam).

Figure 3:
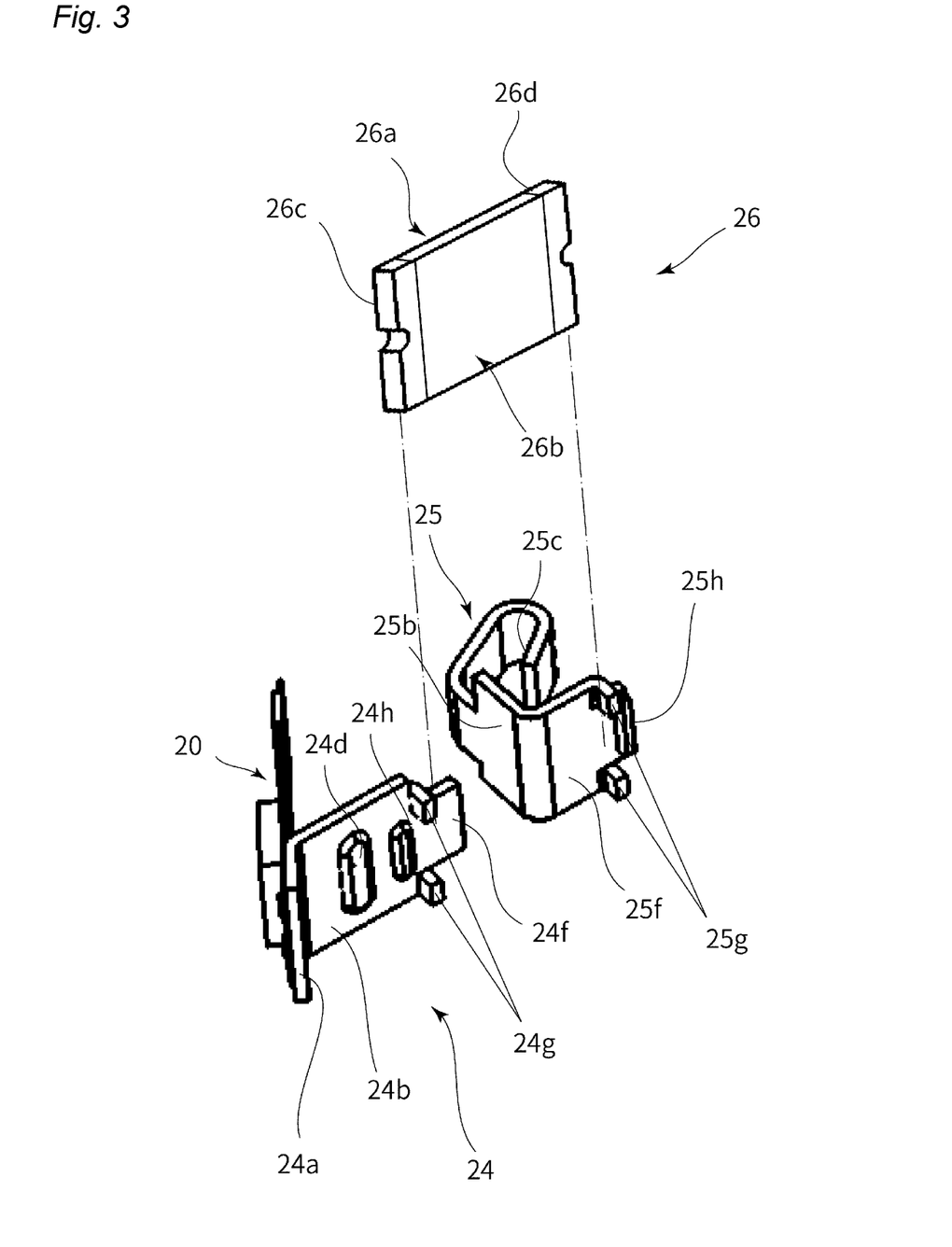
FIG. 3 is an exploded perspective view illustrating a first terminal, a second terminal, and a PTC thermistor.

FIG. 3 is an exploded perspective view illustrating the first terminal 24, the second terminal 25, and the PTC thermistor 26.

As illustrated in FIG. 3, the second terminal 25 is disposed at a position separated from the first terminal 24. In the embodiment, each of the first terminal 24 and the second terminal 25 is formed by bending one metal plate or by performing other sheet metal working. The first terminal 24 includes an attaching portion 24a to which the brush arm of the brush 20 is attached, a fixing portion 24b linked to the attaching portion 24a, and a bonding portion 24f which extends toward the second terminal 25 from the fixing portion 24b. The second terminal 25 includes a fixing portion 25b, a connection portion 25c for external connection linked to the fixing portion 25b, and a bonding portion 25f which is linked to the fixing portion 25b and is disposed to be positioned substantially on the same plane as the bonding portion 24f.

The entire PTC thermistor 26 has a shape of a rectangular plate. In two side portions of the PTC thermistor 26, a first electrode 26c and a second electrode 26d are disposed. Each of the electrodes 26c and 26d is exposed on one surface 26a of the PTC thermistor 26, a surface 26b on the other side, and a side surface. In other words, the PTC thermistor 26 is a surface-mount type thermistor in which two electrodes 26c and 26d are exposed to one surface 26a side (mounting surface side).

The PTC thermistor 26 is disposed between the first terminal 24 and the second terminal 25. On one surface 26a in the PTC thermistor 26, the electrode 26c is disposed to face the bonding portion 24f of the first terminal 24, and the electrode 26d is disposed to face the bonding portion 25f of the second terminal 25. The bonding portion 24f of the first terminal 24 is bonded to the electrode 26c by soldering. The bonding portion 25f of the second terminal 25 is bonded to the electrode 26d by soldering. Accordingly, the first terminal 24 and the second terminal 25 are electrically connected to each other via the PTC thermistor 26. In other words, the connection portion 25c of the second terminal 25 and the brush 20 attached to the attaching portion 24a of the first terminal 24 are conductive to each other. In the drawing, the solder is omitted. As a bonding method of each of the first terminal 24 and the second terminal 25 and the electrodes 26c and 26d of the PTC thermistor 26, other methods may be employed.

Figure 4:
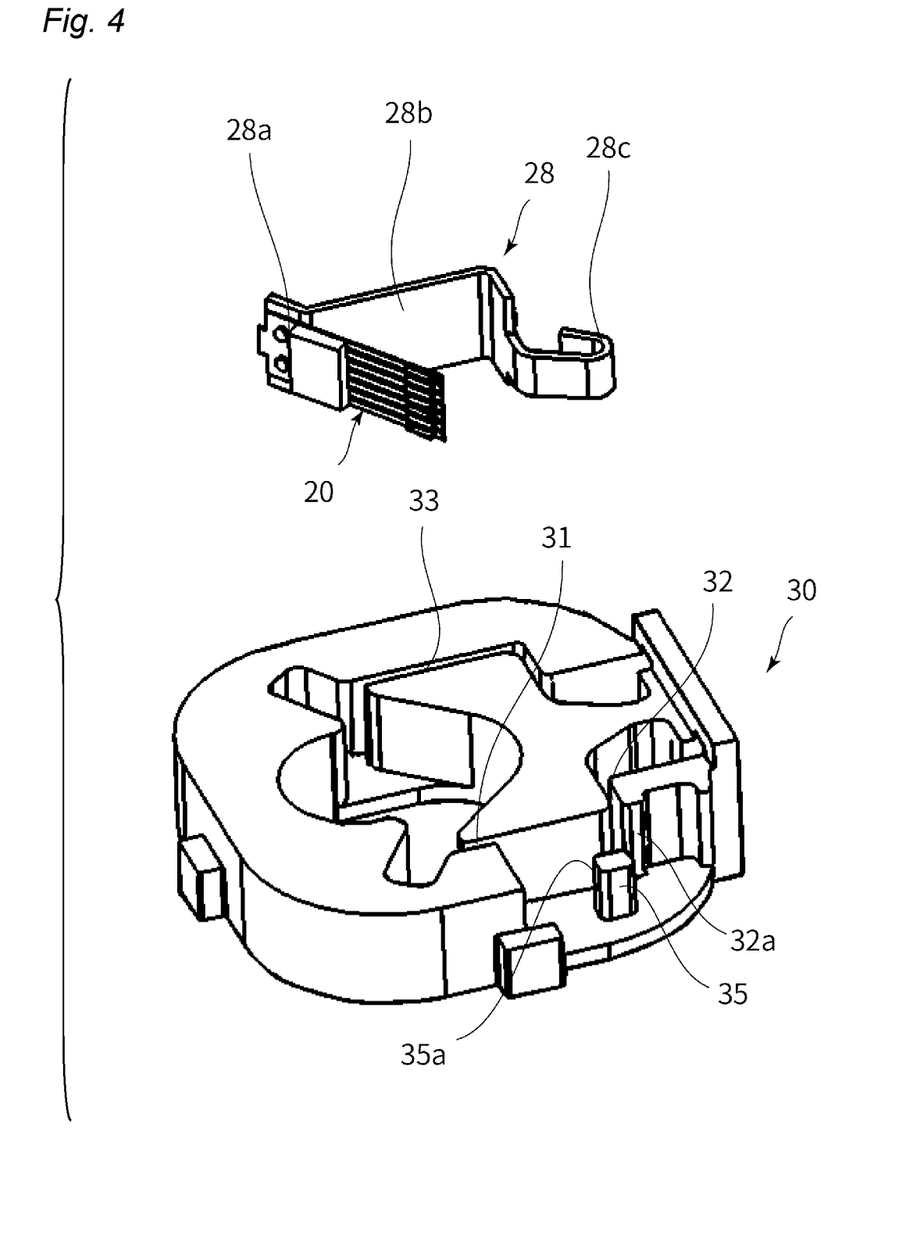
FIG. 4 is an exploded perspective view illustrating a third terminal and a bracket.

FIG. 4 is an exploded perspective view illustrating the third terminal 28 and the bracket 30.

As illustrated in FIG. 4, the third terminal 28 includes an attaching portion 28a to which the brush arm of the brush 20 is attached, a fixing portion 28b linked to the attaching portion 28a, and a connection portion 28c linked to the fixing portion 28b. In the embodiment, the third terminal 28 is formed by bending one metal plate. The attaching portion 28a, the fixing portion 28b, and the connection portion 28c have a shape of a plate.

The bracket 30 is a resin molded article having a thickness in a shaft direction (axial direction or longitudinal direction) of the rotation shaft 2. The bracket 30 is formed such that the rotation shaft 2 penetrates therethrough. The bracket 30 is formed such that the connection portion 28c of the third terminal and the connection portion 25c of the second terminal 25 are exposed to the outside of the frame assembly 1a, and an external terminal can be inserted thereinto. By connecting the external terminal to each of the connection portions 25c and 28c and by applying the driving voltage between the connection portions 25c and 28c, the motor 1 can be driven.

In the bracket 30, three groove portions 31, 32, and 33 are formed. Each of the groove portions 31, 32, and 33 is formed such that the shaft direction (axial direction or longitudinal direction) of the rotation shaft 2 is a depth direction. In the bracket 30, a columnar projection (one example of a positioning portion) 35 is formed.

The groove portion 31 is formed to hold the fixing portion 24b of the first terminal 24. As illustrated in FIG. 3, in the fixing portion 24b of the first terminal 24, a bump portion 24d is formed. The first terminal 24 is fixed to the bracket 30 in a state where the fixing portion 24b is press fitted into the groove portion 31 by partially nipping the bracket 30 between the bump portion 24d and the attaching portion 24a.

The groove portion 32 is formed to hold the fixing portion 25b of the second terminal 25. As illustrated in FIG. 3, each of the connection portion 25c and the bonding portion 25f is connected to the fixing portion 25b to be bent. In addition, in the groove portion 32, in the end portion on the side on which the PTC thermistor 26 is disposed, a protrusion portion 32a which protrudes toward the PTC thermistor 26 is formed. The second terminal 25 is fixed to the bracket 30 in a state where the fixing portion 25b is press fitted into the groove portion 32 by biasing the bonding portion 25f such that the protrusion portion 32a widens an angle between the connection portion 25c and the bonding portion 25f.

The groove portion 33 is formed to hold the fixing portion 28b of the third terminal 28. The third terminal 28 is fixed to the bracket 30 in a state where the fixing portion 28b is press fitted into the groove portion 32.

As illustrated in FIG. 3, in the embodiment, in the first terminal 24, on a surface of the bonding portion 24f which faces the PTC thermistor 26, a claw portion (one example of a first projection) 24g formed to protrude from the surface is provided. The claw portions 24g are provided at two locations to nip the center of the bonding portion 24f in the shaft direction (axial direction or longitudinal direction) of the rotation shaft 2. In addition, in the second terminal 25, on a surface of the bonding portion 25f which faces the PTC thermistor 26, a claw portion (one example of a second projection) 25g formed to protrude from the surface is provided. The claw portions 25g are also provided at two locations to nip the center of the bonding portion 25f in the shaft direction (axial direction or longitudinal direction) of the rotation shaft 2. The claw portions 24g and 25g protrude to the side on which the PTC thermistor 26 is disposed. The protrusion height of the claw portions 24g and 25g is, for example, approximately the same as or slightly less than the thickness of the PTC thermistor 26, but the protrusion height is not limited thereto.

Figure 5:
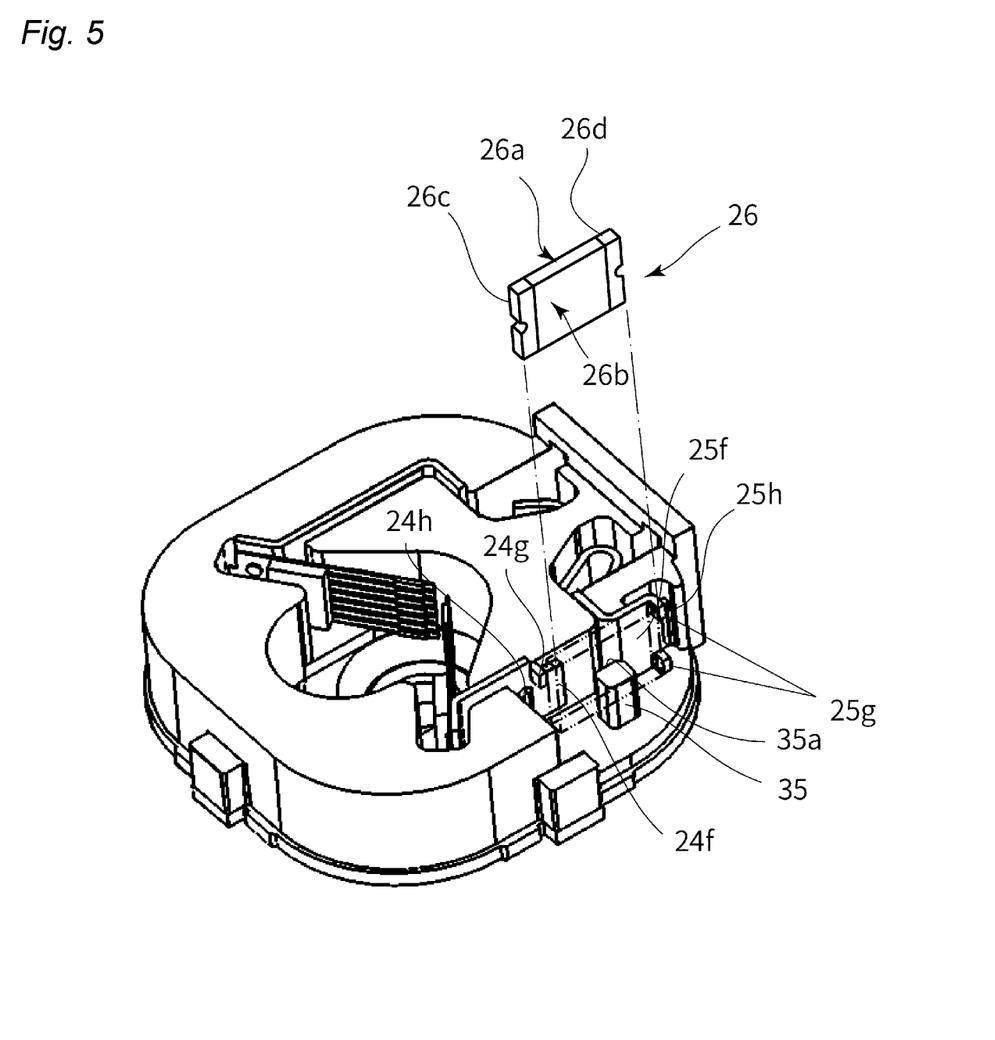
FIG. 5 is a view describing an attaching structure of the PTC thermistor.

FIG. 5 is a view describing an attaching structure of the PTC thermistor 26.

As illustrated in FIG. 5, the PTC thermistor 26 is disposed between the claw portion 24g and the claw portion 25g. A position of a side end portion on the first electrode 26c of the PTC thermistor 26 is regulated by the claw portion 24g such that the electrode 26d is not separated from the second terminal 25 to the first terminal 24 side. A position of a side end portion of the electrode 26d of the PTC thermistor 26 is regulated by the claw portion 25g such that the electrode 26c is not separated from the first terminal 24 to the second terminal 25 side. In other words, on each of the surface which faces the PTC thermistor 26 of the first terminal 24 and a surface which faces the PTC thermistor 26 of the second terminal 25, the claw portions 24g and 25g are formed to protrude from the surfaces and to be capable of positioning the PTC thermistor 26, respectively. Accordingly, when bonding the PTC thermistor 26 to the first terminal 24 or the second terminal 25, it is possible to easily position the PTC thermistor 26 with respect to the first terminal 24 or the second terminal 25.

In the embodiment, the columnar projection 35 is provided in the bracket 30. The PTC thermistor 26 can be positioned with respect to the first terminal 24 and the second terminal 25 by the columnar projection 35. Specifically, the columnar projection 35 has a positioning surface 35a which faces the surface 26b on a side opposite to the mounting surface 26a of the PTC thermistor 26 in a state where the mounting surface 26a side of the PTC thermistor 26 faces the first terminal 24 and the second terminal 25.

In this manner, the claw portions 24g and 25g are provided in the first terminal 24 and the second terminal 25, respectively. The columnar projection 35 is provided in the bracket 30. When attaching the PTC thermistor 26, in a state where the first terminal 24 and the second terminal 25 are fixed to the bracket 30, first, the PTC thermistor 26 is disposed in a space surrounded by the bonding portion 24f, the bonding portion 25f, the claw portions 24g, the claw portions 25g, and the columnar projection 35. At this time, the PTC thermistor 26 is in a state of being positioned with respect to the first terminal 24, the second terminal 25, and the bracket 30 by each portion on the periphery thereof. In other words, the PTC thermistor 26 is in a state of being temporarily fixed to the first terminal 24, the second terminal 25, and the bracket 30. In addition, in the state, by soldering the electrode 26c and the bonding portion 24f, and by soldering the electrode 26d and the bonding portion 25f, it is possible to easily bond the PTC thermistor 26 to the first terminal 24 and the second terminal 25. The number or the shape of the claw portions is not limited to the description above. In the bracket 30, a positioning portion of the structure having a positioning surface that faces the surface 26b of the PTC thermistor 26 may be formed in another shape which is not a columnar shape.

In the embodiment, on a surface that faces the PTC thermistor 26 of the first terminal 24, at the position separated from the bonding portion 24f bonded to the PTC thermistor 26, a flow suppressing portion 24h which is formed to protrude from the surface is provided. The flow suppressing portion 24h is formed by performing drawing such that a part of the first terminal 24 projects. In addition, on a surface that faces the PTC thermistor 26 of the second terminal 25, at the position separated from the bonding portion 25f bonded to the PTC thermistor 26, a flow suppressing portion 25h which is formed to protrude from the surface is provided. The flow suppressing portion 25h is formed while a part of the second terminal 25 is bent. A flow of the solder (not illustrated) for bonding the electrode 26c of the PTC thermistor 26 to the bonding portion 24f is blocked by the flow suppressing portion 24h. A flow of the solder (not illustrated) for bonding the electrode 26d to the bonding portion 25f is blocked by the flow suppressing portion 25h. In other words, as the flow suppressing portion 24h is provided in this manner, in manufacturing the motor 1, it is possible to prevent generation of a defect caused by the flow of the solder into a region in which the armature assembly 1b is disposed or other regions inside of the motor 1. The flow suppressing portion 24h or the flow suppressing portion 25h may be formed to be recessed from the surface on which the bonding portions 24f and 25f are provided. The flow suppressing portion 24*h* or the flow suppressing portion 25*h* may be provided only in any one of the first terminal 24 and the second terminal 25.

As described above, in the embodiment, in the DC motor 1, the surface mounting type PTC thermistor 26 is disposed between the first terminal 24 and the second terminal 25, and the first terminal 24 and the second terminal 25 are connected to each other via the PTC thermistor 26. In other words, by using the surface mounting type PTC thermistor 26, since it is possible to perform current limiting of the DC motor 1, without increasing the size of the DC motor 1, it is possible to use the PTC thermistor 26 having required characteristics. Specifically, for example, since it is possible to use the PTC thermistor 26 having relatively low internal resistance compared to the size of the element, it is possible to prevent deterioration of torque characteristics of the DC motor 1. Since the PTC thermistor 26 is bonded to the first terminal 24 and the second terminal 25, it is not necessary to use an additional mounting substrate or the like, and it is possible to suppress the number of components of the DC motor 1 to be small.

As described above, before bonding the PTC thermistor 26 to the first terminal 24 and the second terminal 25, a state where the PTC thermistor 26 is temporarily fixed to the first terminal 24 and the second terminal 25 is possibly set. Therefore, it is possible to easily perform bonding work of the PTC thermistor 26, and to suppress the manufacturing costs of the DC motor 1 to be low.

In the above-described embodiment, a structure in which the PTC thermistor is positioned by the claw portion and the columnar projection is achieved, but the claw portion and the columnar projection may not be provided. It is sufficient that a structure in which the surface mounting type PTC thermistor is bonded to the first terminal and the second terminal is provided. Not being limited to a case where the PTC thermistor is bonded to the first terminal and the second terminal in a state where the first terminal and the second terminal are fixed to the bracket, a module in which the PTC thermistor is bonded to the first terminal and the second terminal in advance may be fixed to the bracket.

In addition, shapes and positional relationships therebetween of each of the first terminal, the second terminal, the third terminal, and the brush are not limited to the description above. The shapes and the positional relationships may be appropriately changed in accordance with the shape or the size of the DC motor, a bonded state or the like between the second terminal or the third terminal and the external terminal or the like.

According to the present disclosure, there is provided a DC motor which is capable of usage of the surface-mount type PTC thermistor and has less number of components.

All the contents of the above-described embodiment are examples and are not considered as restrictive contents. It is intended that the range of the invention is indicated by the range of the claims without being limited to the above-described description, and includes all changes in the meaning and the range equivalent to the range of the claims.

What is claimed is:

1. A DC motor comprising:
a brush configured to be connectable with a commutator;
a first terminal attached to the brush;
a second terminal disposed at a position away from the first terminal, the second terminal being configured to be connectable with an external terminal;
a bracket to which the first terminal and the second terminal are attached; and
a positive temperature coefficient (PTC) thermistor disposed between the first terminal and the second terminal, the PTC thermistor including a first electrode bonded to the first terminal and a second electrode bonded to the second terminal, the PTC thermistor further comprising a first major planar surface and an opposite second major planar surface,
wherein the PTC thermistor is a surface-mount type thermistor in which the first electrode and the second electrode are both disposed on the first major planar surface, and
wherein, on the first major planar surface of the PTC thermistor, the first electrode faces the first terminal and the second electrode faces the second terminal.

2. The DC motor according to claim 1,
wherein at least one of the first terminal and the second terminal has a surface which faces the PTC thermistor and includes a projection portion formed to protrude from the surface and being capable of positioning the PTC thermistor.

3. The DC motor according to claim 2,
wherein the projection portion comprises a claw portion.

4. The DC motor according to claim 1,
wherein the first terminal has a surface that faces the PTC thermistor and includes a first projection formed to protrude from the surface,
wherein the second terminal has a surface that faces the PTC thermistor and includes a second projection formed to protrude from the surface, and
wherein the PTC thermistor is disposed between the first projection and the second projection.

5. The DC motor according to claim 4,
wherein the first and second projections comprise claw portions.

6. The DC motor according to claim 1,
wherein, on the surface of at least one of the first terminal and the second terminal which faces the PTC thermistor, a flow suppressing portion protruding or being recessed from the surface to suppress a flow of a solder for bonding the PTC thermistor is provided at a position separated from a bonding portion bonded to the PTC thermistor.

7. The DC motor according to claim 1,
wherein the bracket has a positioning portion which is capable of positioning the PTC thermistor with respect to the first terminal and the second terminal.

8. The DC motor according to claim 7,
wherein the positioning portion has a surface which faces a surface opposite to the one surface of the PTC thermistor in a state where the one surface of the PTC thermistor faces the first terminal and the second terminal.

9. The DC motor according to claim 7,
wherein the positioning portion comprises a third projection.

10. The DC motor according to claim 9,
wherein the third projection has a columnar shape.

11. A motor comprising:
a motor frame;
a shaft rotatably supported by the motor frame and extended in an axial direction;
a bracket attached to the motor frame and including a penetration hole through which the shaft is passed and a groove;
a positive temperature coefficient (PTC) thermistor having a first major planar surface and a second major planar surface opposite to the first surface, a first electrode portion is disposed on the first major planar surface and a second electrode portion is disposed on the same first major planar surface;

a first terminal arranged in the groove and attached to a brush; and a second terminal arranged in the groove and arranged at a position away from the first terminal, the second terminal being configured to be coupled with an external terminal, wherein on the first major planar surface, the first electrode portion of the PTC thermistor is coupled to the first terminal and the second electrode portion of the PTC thermistor is coupled to the second terminal.

12. The motor according to claim 11,
wherein the first and second surfaces of the PTC thermistor are arranged at a plane parallel to the axial direction.

13. The motor according to claim 11,
wherein the first terminal has a third surface facing to the first surface and the second terminal has a fourth surface facing to the first surface, the third and fourth surfaces are arranged at a plane parallel to the axial direction.

14. The motor according to claim 11,
wherein the first and second terminals have a claw portion extending to a direction perpendicular to the axial direction and regulates movement of the PTC thermistor in a direction crossing to the axial direction.

15. The motor according to claim 11,
wherein the bracket has a protrusion extending to the axial direction and regulates movement of the PTC thermistor in a direction crossing to the axial direction.

16. A motor comprising:
a motor frame;
a shaft rotatably supported by the motor frame and extended in an axial direction; and
a bracket assembly attached to the motor frame,
wherein the bracket assembly comprises:
a bracket body having a penetration hole and a groove, the shaft is passed through the penetration hole;
a first terminal arranged in the groove;
a second terminal arranged in the groove; and
a positive temperature coefficient (PTC) thermistor having a first major planar surface and a second major planar surface opposite to the first surface and arranged in the groove so that the first and second major planar surfaces are arranged at a plane parallel to the axial direction, only one of the first and second major planar surfaces being faced to both of the first and second terminals.

17. The motor according to claim 16,
wherein the second terminal is arranged at a position away from the first terminal.

18. The motor according to claim 17,
wherein the first and second terminals have a claw portion extending to a direction perpendicular to the axial direction and regulates movement of the PTC thermistor in a direction crossing to the axial direction.

19. The motor according to claim 17,
wherein the bracket body has a protrusion extending to the axial direction and regulates movement of the PTC thermistor in a direction crossing to the axial direction.

* * * * *